US008455064B2

(12) United States Patent
O'Brien et al.

(10) Patent No.: US 8,455,064 B2
(45) Date of Patent: Jun. 4, 2013

(54) UV INKJET PRINTED SUBSTRATES

(75) Inventors: Jeffrey James O'Brien, Walworth, NY (US); Dennis Emmett McGee, Penfield, NY (US)

(73) Assignee: ExxonMobil Oil Corporation, Irving, TX (US)

(*) Notice: Subject to any disclaimer, the term of this patent is extended or adjusted under 35 U.S.C. 154(b) by 935 days.

(21) Appl. No.: 11/590,181

(22) Filed: Oct. 31, 2006

(65) Prior Publication Data

US 2007/0042142 A1 Feb. 22, 2007

Related U.S. Application Data

(63) Continuation-in-part of application No. 10/329,857, filed on Dec. 26, 2002, now abandoned.

(51) Int. Cl.
*B41M 5/00* (2006.01)

(52) U.S. Cl.
USPC ............... 428/32.18; 428/32.21; 428/32.31; 428/32.34; 428/32.38

(58) Field of Classification Search
CPC ........ B41M 5/508; B41M 5/52; B41M 5/5218; B41M 5/506; B41M 5/5254
USPC ........... 428/32.18, 32.21, 32.31, 32.34, 32.38
See application file for complete search history.

(56) References Cited

U.S. PATENT DOCUMENTS

| | | | |
|---|---|---|---|
| 3,753,769 A | 8/1973 | Steiner | |
| 4,058,645 A | 11/1977 | Steiner | |
| 4,058,649 A | 11/1977 | Steiner | |
| 4,226,754 A | 10/1980 | Yun et al. | |
| 4,486,483 A | 12/1984 | Caines | |
| 4,560,614 A | 12/1985 | Park | |
| 4,621,271 A | 11/1986 | Brownstein | |
| 4,686,118 A | 8/1987 | Arai et al. | |
| 4,749,616 A | 6/1988 | Liu et al. | |
| 4,833,172 A | 5/1989 | Schwarz et al. | |
| 4,956,241 A | 9/1990 | Chu et al. | |
| 4,968,063 A | 11/1990 | McConville et al. | |
| 4,981,758 A | 1/1991 | Chu et al. | |
| 5,055,371 A | 10/1991 | Lee et al. | |
| 5,091,236 A * | 2/1992 | Keller et al. ............... 428/213 |
| 5,166,242 A | 11/1992 | Chu et al. | |
| 5,188,867 A | 2/1993 | Chu et al. | |
| 5,225,306 A | 7/1993 | Almog et al. | |
| 5,244,861 A | 9/1993 | Campbell et al. | |
| 5,276,492 A | 1/1994 | Landa et al. | |
| 5,330,831 A | 7/1994 | Knoerzer et al. | |
| 5,346,796 A | 9/1994 | Almog | |
| 5,350,733 A | 9/1994 | Campbell et al. | |
| 5,387,574 A | 2/1995 | Campbell et al. | |
| 5,399,218 A | 3/1995 | Harrison et al. | |
| 5,407,771 A | 4/1995 | Landa et al. | |
| 5,419,960 A | 5/1995 | Touhsaent | |
| 5,424,355 A | 6/1995 | Uemae et al. | |
| 5,451,460 A | 9/1995 | Lu et al. | |
| 5,605,750 A | 2/1997 | Romano et al. | |
| 5,610,215 A | 3/1997 | Nonweiler et al. | |
| 5,789,123 A | 8/1998 | Cleckner et al. | |
| 6,114,022 A | 9/2000 | Warner et al. | |
| 6,130,308 A | 10/2000 | Rink et al. | |
| 6,881,458 B2 | 4/2005 | Ludwig et al. | |
| 2001/0009701 A1 | 7/2001 | Schmitt | |
| 2004/0091645 A1 | 5/2004 | Heederik et al. | |
| 2004/0105940 A1 | 6/2004 | Parrinello et al. | |

FOREIGN PATENT DOCUMENTS

| EP | 317 166 | 5/1989 |
|---|---|---|
| GB | 2 410 705 A | 8/2005 |
| WO | 97/27064 | 7/1997 |
| WO | WO02062894 | 8/2002 |

\* cited by examiner

*Primary Examiner* — Betelhem Shewareged
(74) *Attorney, Agent, or Firm* — Robert L. Abdon; Darryl M. Tyus; Keith A. Bell

(57) ABSTRACT

The present invention relates to printed substrates for use in a variety of applications such as a label stock and flexible packaging structures. The substrates are printed with radiation curable printing ink, especially UV curable printing inks employed in UV inkjet printing processes. The substrates are coated with an ethylene-acrylic acid copolymer based coating capable of adhering and providing wet out properties with UV inkjet inks. Optionally, the coating contains an acrylic polymer. In a specific embodiment, the coating includes a major proportion of ethylene-acrylic acid and minor amounts of filler such as talc and silica. The coating can also include wax and/or pigment such as titanium dioxide. In a further embodiment, the carboxylate groups of the copolymer are neutralized with metal ions from Group Ia, IIa or IIb of the Periodic Table of the Elements, specifically, sodium.

22 Claims, No Drawings

UV INKJET PRINTED SUBSTRATES

CROSS-REFERENCE TO RELATED APPLICATION

This is a continuation-in-part of U.S. application Ser. No. 10/329,857, filed Dec. 26, 2002 now abandoned, incorporated herein by reference in its entirety.

FIELD OF THE INVENTION

The present invention relates to substrates printed with a radiation curable ink image. The substrates have a polymeric coating that makes the substrates suitable for printing with radiation curable inks, especially UV curable printing inks employed in UV inkjet printing processes. The printed substrates are useful for a variety of applications including label stocks and flexible packaging structures.

BACKGROUND OF THE INVENTION

Many different types of printing have been developed, including a large number of processes which are presently in use. The known forms of printing employ a variety of methods for printing onto a substrate. Commonly used forms of printing include offset printing, laser printing, copying devices, dot matrix type impact printers, thermal paper printers, film recorders, thermal wax printers, dye sublimation printers, and inkjet printers. Each type of printer has its own advantages and problems when considering cost, speed, quality, reliability, and simplicity of construction and operation.

Electrostatic printing is a very effective method of image transfer commonly used in photocopying and photoprinting. Typically, in electrostatic printing, a potential electrostatic image is formed on an imaging surface carrying a uniform electrostatic charge. The uniform electrostatic charge can be created by exposing the surface to corona discharge. The uniform electrostatic charge is then selectively discharged by exposing it to a modulated beam of light which corresponds to an image formed from an original. The discharged surfaces form the background while the charged surfaces form the print image. The print image is developed by applying pigmented toner particles which adhere to the undischarged "print" portions of the surface. The pigment is subsequently transferred by various techniques to a copy sheet.

Dry toner is most commonly used in electrostatic printing. The quality and clarity of the image and image resolution is related to the size of the toner particles. While it is thought that very fine particles will produce a finer image, there is a practical limitation on the size of toner particles that can be used. Dry toner particles must be of sufficient weight and size to be deposited onto the print surface without becoming airborne, which is thought to lead to machinery fouling and, possibly, environmental problems. Additionally, in fixing the image, the dry toner particles are fused onto the paper by exposure to very high temperatures, e.g. in excess of about 400° F. (204° C.). This energy requirement is a significant drawback.

To overcome these disadvantages, liquid toners were developed in which the toner is dispersed in a solvent. The solvent is removed in the last printing step by the mechanism of the press. Because of the liquid medium, very fine dye particles can be employed without concern for the particles becoming airborne. Thus, copies of very high resolution can be made and high temperatures needed to fuse dry toners are not required. Liquid toners for electrostatic imaging are described in U.S. Pat. Nos. 5,225,306; 5,276,492; 5,346,796; and 5,407,771.

Paper is widely used as the image-receiving element in electrostatic imaging. It would be advantageous to use plastic as the receiving element. Among other advantages over paper, plastic is moisture resistant, flexible, and heat sealable and plastic substrates can be either clear or opaque. However, the high temperatures necessary for imaging with the dry toners will melt plastic films and the liquid toners do not transfer well or adhere to uncoated plastic.

U.S. Pat. No. 5,789,123 to Cleckner et al. discloses a liquid toner printable thermoplastic film. The film is coated with an ethylene-acrylic acid copolymer based coating capable of electrostatic imaging with liquid toner. Optionally, the coating contains acrylic polymer. In a specific embodiment, the coating includes a major proportion of ethylene-acrylic acid and minor amounts of filler such as talc and silica. The coating can also include wax and/or pigment such as titanium dioxide. In a further embodiment, the carboxylate groups of the copolymer are neutralized with metal ions from Group Ia, Ia or IIb of the Periodic Table of the Elements, specifically, sodium.

In recent years, the field of inkjet printing, wherein each individual pixel of ink is derived from one or more ink nozzles, has become increasingly popular primarily due to its inexpensive and versatile nature. In a typical inkjet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol, or mixtures thereof.

An inkjet recording element typically comprises a support having on at least one surface thereof an ink-receiving or image-forming layer, and includes those intended for reflection viewing, which have an opaque support, and those intended for viewing by transmitted light, which have a transparent support.

While a wide variety of different types of image-recording elements for use with inkjet devices have been proposed heretofore, there are many unsolved problems in the art and many deficiencies in the known products which have limited their commercial usefulness.

For example, it is well known that in order to achieve and maintain photographic-quality images on such an image-recording element, an inkjet recording element must: (a) be readily wetted so there is no puddling, i.e., coalescence of adjacent ink dots, which leads to non-uniform density, (b) exhibit no image bleeding, (c) absorb high concentrations of ink and dry quickly to avoid elements blocking together when stacked against subsequent prints or other surfaces, (d) exhibit no discontinuities or defects due to interactions between the support and/or layers, such as cracking, repellencies, comb lines, and the like, (e) not allow unabsorbed dyes to aggregate at the free surface causing dye crystallization, which results in bloom or bronzing effects in the imaged areas, and (f) have an optimized image fastness to avoid fade from contact with water or radiation by daylight, tungsten light, or fluorescent light.

An ink jet recording element that simultaneously provides an almost instantaneous ink dry time and good image quality is desirable. However, given the wide range of ink compositions and ink volumes that a recording element needs to accommodate, these requirements of inkjet recording media are difficult to achieve simultaneously.

The rise of radiation-curable, especially UV curable, inks in inkjet printing processes are highly desirable since, after appropriate curing, radiation curable inks provide a tough, durable image upon the substrate to which they are applied. This makes the process especially applicable to printing on plastics packaging where high durability is required. Therefore, it can be applied not only to conventional cellulosic substrates such as paper and board, but also to synthetic polymeric substrates.

As is commonly known in the art, the addition of filler(s) to a polymeric film substrate serves to improve the strength and permanence of the film. In printing applications, filler(s) may also be used to absorb excess ink and solvent to enhance print quality. In the prior art, large quantities of filler, for example greater than 5.0 wt %, are typically employed in the substrate composition to promote these qualities.

U.S. Patent Application Publication US-2001/0009701-A1 discloses UV curing printing inks having a UV curable fixing agent system comprising a polymerizing fixing agent or a mixture of fixing agents and one or more associated photo-initiators. The polymerization or cross-linking can be triggered by UV irradiation to cure the ink. Publication US-2001/0009701-A1 differentiates between radical-induced and cationic polymerization. Conventional radical-induced polymerizing fixing agents are based on acrylates, whereas cationic polymerizing fixing agents are characterized by acid release during UV irradiation. Publication US-2001/0009701-A1 also notes that UV curing printing inks have practical advantages from a technical applications point of view compared to solvent-containing inks, e.g., with regard to their working lifetime, solvent related environmental pollution, and waste disposal.

As is commonly known in the art, the use of fillers in polymeric coatings for UV ink jet printing applications increases both the surface area and the density of the polymer. However, the use of fillers in these applications is also known to negatively impact yield (i.e., film surface area per weight unit of the thermoplastic film). Accordingly, there is a need for a thermoplastic film capable of receiving UV curable printing inks which provide satisfactory ink adhesion and high print quality while employing reduced amounts of filler in the film composition to increase overall yield.

SUMMARY OF THE INVENTION

The present invention relates to printed substrates having an image printed with a radiation curable printing ink, especially UV curable printing inks employed in UV inkjet printing processes. More specifically, the present invention provides a printed substrate with a coating comprising a copolymer derived from a carboxylic acid containing vinylic unsaturation and, optionally, from about 0.1 wt % to about 5.0 wt % filler onto which the image is printed with a radiation curable ink.

DETAILED DESCRIPTION OF THE INVENTION

As a general overview, the present invention relates to a substrate having a coating on which an image is printed with a radiation curable ink, especially UV curable printing ink employed in UV inkjet printing processes.

More specifically, the present invention provides a substrate with at least one copolymer derived from a carboxylic acid containing vinylic unsaturation and, optionally, from about 0.1 wt % to about 5.0 wt % filler, and a radiation curable ink image printed on the coating. The coating permits the substrate to be printed with radiation curable printing ink, especially UV curable printing inks used in a UV inkjet printing process.

The carboxylic acid copolymer component of the coating typically comprises a copolymer of acrylic acid or methacrylic acid or esters of those acids. The acrylates contemplated contain lower alkyl groups such as those ranging from about 1 carbon atom to about 16 carbon atoms; specific examples include methyl, ethyl, butyl, lauryl, and stearyl. In one embodiment the acrylic copolymer includes a functional comonomer, typically having an average molecular weight of at least about 10,000 with about 75 wt. % to about 85 wt. % of ethylene and about 5 wt. % to 35 wt. % of acrylic acid or methacrylic acid. The copolymer may have a number average molecular weight of about 2,000 to 50,000, preferably about 4,000 to 10,000. In another embodiment, the copolymer comprises 15 wt. % to about 25 wt. % of acrylic acid or methacrylic acid.

The copolymer may be supplied as a solution or fine dispersion of an ammonium salt of the copolymer in an ammoniacal water solution. When the copolymer is dried, ammonia is given off and the ionized and water sensitive carboxylate groups are converted to largely unionized and less water sensitive free carboxyl groups.

A suitable ethylene-acrylic acid copolymer is available commercially under the designation MICHEM, particularly MICHEM-4983, by Michelman Corporation. Ethylene-acrylic acid is, typically, produced by high-pressure copolymerization of ethylene and acrylic acid. When ethylene is copolymerized with acrylic acid, the molecular structure is significantly altered by the random inclusion of bulky carboxylic acid groups along the backbone and side chains of the copolymer. The carboxyl groups are free to form bonds and interact with the substrate. Another commercially available ethylene-acrylic acid copolymer is PRIMACOR 4983 sold by Dow Chemical Co. an aqueous dispersion having 25% solids content and obtained from a reaction between 15 mole % acrylic acid and 85 mole % ethylene.

The total amount of the copolymer present in the entire coating composition can range from about 15% to about 100%, specifically about 30% to about 95% by weight based on the entire weight of the coating composition.

The coating can also include a mixture of copolymer and a polymer of a carboxylic acid containing vinylic unsaturation and an acrylic polymer. A specific concentration of polymer to copolymer is about 5% to 50% polymer and about 95% to about 50% copolymer based on the weight of the copolymer.

In one embodiment, the coating can contain a neutralizing metal ion, for example, an alkali metal. In practicing this aspect of the present invention, there is added to the solution or dispersion of the copolymer an amount of ions of at least one metal from Group Ia, IIa or IIb of the Periodic Table of the Elements, preferably, sodium, potassium, lithium, calcium, or zinc ions, and most preferably sodium ions, e.g., in the form of their hydroxides. The quantity of such metallic ions may be in the range sufficient to neutralize, for example, about 2% to 80%, preferably about 10% to 50% of the total carboxylate groups in the copolymer. As an example, sodium ions are added as sodium hydroxide. The amount of sodium hydroxide added corresponds to the foregoing percentages of carboxylate groups which are to be neutralized, for example, about 0.33 phr to 8.8 phr, preferably about 1.1 phr to 5.5 phr, where "phr" stands for parts by weight per hundred parts of the total resin, which is the same as ethylene copolymer when no other resin is present. For the purpose of determining the phr of various additives present in the coating, all the carboxylate groups of the ethylene copolymer are assumed to be in their free carboxyl (—COOH) form.

In addition to the ethylene copolymer, the coatings of the present invention can contain an antiblock/slip agent. Typically, this is a relatively large particle size wax. Wax is known to be a low melting organic compound of relatively high molecular weight that is generally a solid at room temperature. The wax promotes lubricity. Contemplated waxes are natural wax such as animal wax including beeswax, lanolin and shellac wax, vegetable wax such as carnauba wax, candelilla, bayberry and sugar cane wax, mineral waxes such as fossil or earth wax including oxocerite, ceresin and montan wax. Synthetic waxes are also contemplated such as ethylenic polymers and polyol ether-esters, chlorinated naphthalenes and hydrocarbon waxes such as those derived from the Fischer-Tropsch synthesis. Both natural and synthetic microcrystalline waxes are also contemplated. A particularly preferred wax is carnauba wax. The wax may be present in the coating in an amount of, for example, about 1% to about 20%, specifically about 2% to about 10% based on the entire weight of the coating.

In addition to functioning as an anti-blocking material, the wax when incorporated into the coatings of the present invention also functions to improve the "slip" properties of the films coated therewith, i.e., the ability of a film to satisfactorily slide across surfaces at about room temperatures.

The coatings of the present invention may contain a relatively inert particulate filler additive. The filler functions to improve durability and to absorb ink and solvent during printing. Durability and absorption contribute to uniform density of ink application, minimized image bleeding, rapid drying to avoid blocking of the substrate when stacked against subsequent prints or other surfaces, and elimination of unabsorbed dyes at the free surface causing dye crystallization. The coating of the present invention comprises nominal amounts of filler versus the prior art. The nominal filler content of the present invention has been shown to provide excellent absorption of ink and solvent, thus contributing to high print quality.

A filler which has found specific utility in the coating of the present invention is fumed silica. The fumed silica is composed of particles which are agglomerations of smaller particles and which have an average particle size of, for example, about 2 microns to 9 microns, preferably about 3 microns to 5 microns. Generally any finely divided inorganic solid material such as silica is contemplated as a useful filler for purposes of the present coating. These include talc, calcium carbonate, diatomaceous earth, calcium silicate, bentonite, and clay. The total amount of filler typically ranges from about 0.1 wt % to about 5.0 wt %, preferably from about 0.1 wt % to about 4.0 wt %, more preferably from about 0.1 wt % to about 3.0 wt %, based on the entire weight of the coating. When a transparent substrate, such a clear polymeric film, is desired, the nominal amount of filler promotes clarity in the film, yet provides sufficient absorption of the ink and solvent during printing. The filler particulates are generally small in size, typically ranging from about 1 µm to about 10 µm, specifically from about 3 µm to about 7 µm. Further examples of fillers include kaolin, silica, aluminum silicates, clay, and talc. Pulp is also contemplated.

Preferred among the foregoing fillers are those that may function as antiblock/slip agents. Silica is a specific example of a filler which is found to function in this manner.

Opacity enhancing particulates may also be employed. These are relatively inert substances. Calcium carbonate is extensively used in thermoplastics. It is relatively inexpensive and easy to use. It can be used in its natural form but "precipitated calcium carbonate" which is prepared by chemical processes can be employed. Sometimes, particles of calcium carbonate are coated with a resin to reduce plasticizer absorption and this form can also be employed.

The filler can also include pigment-imparting particulates. Pigments contemplated are organic or inorganic substances with particle sizes which are rarely less than 1 micron in diameter. Typical pigments include carbon black and titanium dioxide. Calcium carbonate can also act as a pigment. Other pigments not to be excluded by the present invention are metallic pigments such as particles of aluminum, copper, gold, bronze, or zinc. These pigments are usually flake shaped particles which reflect light when incorporated into the coating vehicle.

The fillers, including inert particulate slip/antiblock agents, opacifying agents, and/or pigments can be used in combination, depending upon the desired degree of translucency or opacity. Typically, when the opacifying particulates and/or pigments are used, the concentration is less than about 70% of the total particulate concentration of the coating, specifically about 20% to about 50% of the total particulate concentration of the coating.

Further specific examples of particulates which may be employed in addition to those noted above include acetylene black, alpha cellulose, aluminum silicates, barium sulfate, calcium silicate, calcium sulphate, cellulose, clays, diatomite, glass flake, keratin, lignin, lithophone, mica, microballoons, molybdenum disulfide, nepheline syenite, paper, pulp, quartz, shell flour, talc, vermiculite, and wood.

Other optional additives which can be used include cross-linking agents such as melamine formaldehyde resins which may be present in an amount, for example, of less than about 25 wt. %, anti-static agents such as poly (oxyethylene) sorbitan monooleate which may be present in an amount, for example, of less than about 10 wt. %, and antifoam agents such as silicone oil or fluorocarbon which may be present in an amount of less than about 0.1 wt. %, based on the entire weight of the coating.

The coating is made by combining all the ingredients sequentially or at the same time and mixing or blending them at room temperature and atmospheric pressure conditions in a conventional mixing apparatus. Typically, the coating is in an aqueous media having a solids content of about 1% to about 60%, specifically about 5% to about 50% based on the entire weight of the final coating composition.

A suitable coating composition in accordance with the present invention may be prepared by combining 1146 g of ethylene acrylic acid copolymer emulsion (MICHEM 4983 sold by Michelman), 57.3 g Carnauba wax (M-215 sold by Michelman), 1.15 g talc and 0.85 g fumed silica (SYLOID 42 sold by the Davison Chemicals division of Grace). All the components are added to an aqueous solution. Water is added to bring the final coating composition to a solids content of 5%.

The coating is applied to the desired substrate. Typically the substrate is primed to improve adhesion of the coating to the substrate coated. The coating weight applied can vary depending on the substrate coated.

The coatings may be applied utilizing standard gravure coating apparatus and techniques. In one embodiment of the present invention, prior to coating, a polymeric film substrate is subjected to corona treatment and a polyethyleneimine primer is applied to the treated surface. In one embodiment, the total weight of the coating, on an oriented polymeric film, treated, primed surface following drying, is from about 0.1 to about 4 g/m$^2$.

The result will be an improved UV ink jettable surface defined by higher print quality.

For the polymeric film substrates, any single or multi-layer thermoplastic material that can be formed into a thin film may be used in accordance with the present invention. The substrate can be clear or opaque. The opacity of opaque films may be achieved by cavitating, creating voids, in one or more layers of the polymeric film substrate or by other means. Contemplated thermoplastic materials include any polyolefin such as polypropylene, polyethylene, polybutene, polystyrene, polyvinyl chloride, copolymers, and blends thereof. Other suitable film materials include polyethylene terephthalate, other polyesters (including but not limited to polyethylene terephthalate glycol [PETG], polyethylene naphthalate [PEN] and liquid crystalline polymers [LCP]), and nylon. In multilayer films, there is one or more skin layers located on at least one surface of a thermoplastic core layer. The skin layer can comprise polyethylene, including medium and high-density polyethylene, polypropylene, copolymer, or terpolymer of $C_2$-$C_5$ alpha olefins or blends thereof. At least one side of the film can comprise a heat seal or pressure seal surface. Typical heat seal materials comprise ethylene and propylene homopolymers, copolymers or terpolymers such as ethylene-propylene, ethylene-propylene-butene-1, propylene/butene-1, and polyvinylidenechloride polymers. Any of the materials can contain processing aids or inorganic particulates such as titanium dioxide or void initiating agent to enhance the whiteness or color of the substrate or to enhance antiblocking properties.

In accordance with the present invention, the substrate may a single or multiple layers. For example, the substrate may be a 3-layer polymeric film which comprises a core layer and two outer layers, the core layer comprising polypropylene and at least one of the outer layers can be selected from the group consisting of a copolymer or terpolymer of propylene and ethylene and/or butene-1 or ethylene homopolymer.

In another embodiment of the present invention, the substrate may be a 5-layer polymeric films which comprises a core layer, two intermediate layers contiguous to the central core layer and two outer layers, the polymer of at least one of the intermediate layers can comprise polypropylene and the polymer of at least one of the two outer layers can comprise a copolymer or terpolymer of propylene and ethylene and/or butene-1 or ethylene homopolymer.

A particular type of thermoplastic film which can be advantageously coated with the coating compositions of the present invention is molecularly oriented isotactic polypropylene. After extrusion of the substrate, for example, the base polypropylene film, utilizing conventional extrusion techniques, the film is heated and molecularly oriented by stretching it both in the longitudinal and transverse directions. The resulting oriented film exhibits greatly improved tensile and stiffness properties. Typically the polyolefin resin, such as polypropylene, is extruded through a flat sheet extruder die at a temperature ranging from between about 200° C. to about 250° C., casting the film onto a cooling drum and quenching the film. The sheet is then stretched about 3 times to about 7 times in the machine direction (MD) orienter followed by stretching about 5 times to about 10 times in the transverse direction (TD) orienter.

The coating composition of the present invention may be applied to both surfaces of the substrate. However, this might pose blocking problems. Alternatively, one surface may have another coating composition applied to it on a side opposite to the image receiving surface. This other side of the film can be coated with a heat seal or a slip modifying material.

A primer may be used to enhance binding of the coating of the present invention to the substrates, particularly uncoated polymeric films. Typical primers are polymers with good adhesion to the uncoated films such as polyethyleneimine and epoxy resins.

Typically, in connection with polymeric films, prior to coating the film with the final formulated composition of the present invention, the film surface is treated to create a high-energy surface environment sufficient for the adhesion of a primer or other coating such as by flame or corona treatment or other method which can oxidize the film surfaces. Corona treatment is accomplished by exposing the film surface to a high voltage corona discharge while passing the film between spaced electrodes. Exemplary alternative treatment methods include flame treatment, gas treatment, plasma treatment, and any other treatment method that promotes adherence of the coating.

After electronic treatment of the film surface, the coating can be applied. The coating can be applied to the substrate as an aqueous emulsion in-line after the machine direction orientation but before the transverse direction orientation. This procedure is described in U.S. Pat. No. 5,451,460. The uniaxially drawn film may be subjected to surface treatment prior to coating.

Alternatively, the coating can be applied off-line, by any conventional method. For example, the substrate can be coated by roller coating, spray coating, slot coating, or immersion coating. Gravure roll coating or reverse direct gravure coatings are acceptable methods. The excess coating solution can be removed by squeeze rolls or doctor knives.

Regardless of these methods, the amount should be such that upon drying a smooth, evenly distributed layer is obtained. A typical coating weight ranges from about 0.1 g/m² to about 10 g/m².

In one embodiment of the present invention, the coating can be applied by coextrusion with polymeric layers of the substrate.

The substrate can be of any desired thickness, although thicknesses will typically range from about 20 microns to about 100 microns for high-speed equipment.

The present invention provides a printed substrate which is suitable for use in a variety of applications. The printed substrates are suitable for use as flexible packaging material, labels, signage and any other application in which a UV inkjet printed substrate may be utilized.

In one embodiment, the printed substrates of the present invention are useful as laminated stock. A lamination stock should have the attributes of good ink retention and the printing quality characteristics, such as low magnitude of reflection. This stock when laminated to a translucent backing can act as "Day-night" film signage when illuminated from behind, when laminated to an opaque backing can act as typical signage. Exemplary applications are airport graphics, backlit photography, fast food menu boards, indoor banners and signs, and exhibit signage.

In another embodiment, the printed substrates of the present invention are useful as a flexible film stock. When used as a flexible film stock the film can be UV inkjet printed as the film is converted as a flexible film package. The film can be printed inline or out of line with commercially available printers such as HP DesignJet 5000 Series printer, Color Span Mach 12, Barco Graphics "The Factory" printing press, Chromas "Argio" printing press or other UV inkjet presses.

The printed substrates of the present invention are useful in the decorative market for such materials as wallpapers and other coverings. Wallpaper needs to have the attributes of good ink retention and the ability to preferentially adhere to an adhesive.

The printed substrates of the present invention are particularly useful as label stock structures. Label stocks need to have the attributes of good ink retention and the ability to adhere to other film layers or coatings such as a pressure sensitive adhesive, as compared to the ability of that adhesive to adhere to a release layer. It may be further desirable for a label stock to have the attribute of clarity, or low haze, in non-printed regions. This is particularly useful for label stocks used on consumer products where a "no-label" appearance is preferred.

A suitable peelable label stock is often an assemblage of components. In one such assemblage, the components include: a base liner, optionally, a release layer disposed on the base liner, and a facestock with adhesive disposed between the baseliner and the facestock. The facestock is releasably adhered to the release layer on the base liner. In instances where the adhesive is pressure sensitive, the release layer is disposed on the base liner. In other cases, the adhesive may be activatable by application of heat, solvent, etc. Typically, when the adhesive is not pressure sensitive, a release liner is unnecessary.

For polymeric films, used as a base or core layer for label stock, the substrate material of the present invention may be white opaque in order to provide a contrasting background for the printed matter applied thereto.

Typical pressure sensitive adhesives are hot melt adhesives, for example, styrene-isoprene-styrene block copolymers ("S-246" available from Fasson, the "DURO-TAK" line of adhesives sold by National Starch including "DURO-TAK 9866" and "DURO-TAK 4206"), styrene-ethylene butylene-styrene block copolymer compounds ("DURO-TAK 9684" sold by National Starch); water-based pressure sensitive adhesives, for example, acrylic emulsions (sold by Unocal under product numbers 9612, 9646 and 9202, Air Products under product designations GP-2, LC-31 and SP-27, Rohm & Haas under product designation PS-67, and National Starch under product designation NACOR-4537), ethylene vinyl acetate multipolymer emulsions (sold by National Starch under the product designation "EVA-TAK 9685" and EVA-TAK 9715), rubber-resin emulsions (sold by Dyna-tech under product designation 2412); and solvent-based pressure sensitive adhesives, for example thermoplastic acrylic (sold by National starch under product designation "DURO-TAK 2434"), self-cross linking acrylic (sold by National Starch under product designation "DURO-TAK 1068" and DURO-TAK 1077) and rubber-based compounds (sold by National Starch under product designation "DURO-TAK 6172" and "DURO-TAK 9718").

Suitable release liners include, but are not limited to, silicone coated release substrates. Substrates contemplated are supercalendered Kraft-brand paper, glassine, polyester (such as polyethyleneterephthalate), polyethylene coated Kraft-brand paper, polypropylene-coated Kraft-brand paper, or a thermoplastic substrate sold by ExxonMobil Chemical Company under the product name "PROLINER." Typically these substrates are coated with a thermally cured silicone release coating such as cross-linked vinyl functionalized polydimethylsiloxane (sold by Dow Corning under the name "SYL-OFF 7686").

Release liners comprising substrates such as glassine, poly-coated Kraft-brand paper, polyethylene terephthalate, oriented or cast polypropylene, polyethylene, or polystyrene can be coated with radiation or electron-beam curable silicone such as UV curable silicone (sold by GE under the name "UV9300", "UV 9315" and "UV 9310C") and electron-beam curable silicone (sold by Goldschmidt under the name "RC726" and "RC705").

Typically, the pressure sensitive adhesive is coated onto the release liner and oven dried, typically at temperatures ranging from about 35° C. to about 125° C. However, the temperature of drying often depends upon the type of adhesive. Solvent-based adhesives are usually dried at about 66° C. and water-based adhesives are usually dried at about 93° C. After drying, the release liner is laminated to the adhesive anchor coated side of the label facestock.

The coated substrates in accordance with the present invention may be coated with a variety of radiation curable inks, especially UV curable inks, may be applied to provide a tough, durable image. While it is believed that all types of radiation curable inks are acceptable, the Example described below focuses on acrylate based UV-curing inks. These can include monoacrylate monomers such as ethoxylated (3) phenol monoacrylate, tripropylene glycol methylether monoacrylate, neopentylglycol propoxylate (2) methylether, monoacrylate [NPG(PO)MEMA], ethoxylated nonylphenol monoacrylate, 2-(2-ethoxyethoxy)ethyl acrylate [EOEOEA], 2-phenoxyethyl acrylate [2 PEA], isobornyl acrylate [IBOA], isodecyl acrylate [IDA], and lauryl acrylate [LA]; diacrylate monomers such as polyethylene glycol 200 diacrylate, polyethylene glycol 600 diacrylate, 1,6-hexanediol diacrylate, tripropylene glycol diacrylate, neopentyl glycol propoxylate (2) diacrylate [NPGPODA], ethoxylated (2) neopentyl glycol diacrylate, trimethylolpropane [TMP] ethoxylate, (3) methylether diacrylate, 1,6-hexane diol diacrylate HDDA, tripropylene glycol diacrylate [TPGDA], propoxylated neopentyl glycol diacrylate [PONPGDA], and polyethylene glycol 400 diacrylate [PEG400DA]; and polyacrylate monomers such as propoxylated (4) glycerol triacrylate, trimethylolpropane tropoxylate (3) triacrylate, ethoxylated (7) trimethylolpropane triacrylate, pentaerythritol tetraacrylate [PET4A], trimethylol propane triacrylate [TMPTA], ditrimethylolpropane tetraacrylate [DTMPTTA], triacrylate [THEICTA], dipentaerythritol pentaacrylate [DPETPA], pentaerythritol triacrylate [PET3A], ethoxylated trimethylol propanetriacrylate [EO3TMPTA], propoxylated glyceryl triacrylate [POGTA], and highly ethoxylated trimethylol-[EO15TMPTA].

In addition, acceptable inks for the present invention include, but are not limited to, UV curing printing inks having a UV curable fixing agent system comprising a polymerizing fixing agent or a mixture of fixing agents and one or more associated photo-initiators and/or coinitiators. These can include: (a) adhesion promoters such as alkoxylated trifunctional acrylate ester, metallic diacrylate, monofunctional acid ester, trifunctional acid ester, trifunctional acrylate ester, and trifunctional methacrylate ester; (b) photo-initiators marketed under the ESACURE-brand family; and (c) coinitiators marketed under the CN-300 series of reactive amine coinitiators.

The present invention will be more specifically illustrated by the following example. While the below described methods and apparatus were used to conduct the test described in the example which follows, other comparable test procedures and instruments known in the art are acceptable.

EXAMPLES

A variety of coated polymeric films available from Exxon-Mobil Chemical Company were evaluated as described in the following Example:
A. Printable Films Used in the Example
1. DIGI-LYTE Film 65 EW-214

DIGI-LYTE Film 65 EW-214 is a white, polypropylene, pressure-sensitive, label facestock designed to be printed on an Indigo Omnius One-Shot Color press. This film offers strength and opacity. It is a 2.6 mil white, two-side coated, multi-layer, biaxially oriented polypropylene (BOPP) film. One side has an ElectroInk-receptive coating. The other side is coated for adhesive anchorage.

2. DIGI-LYTE Film 25 ET-113

DIGI-LYTE Film 25 ET-113 is a clear, polypropylene, label facestock designed to be printed on an Indigo Omnius One-Shot Color press. This film offers strength and high clarity. It is a 2.0 mil clear, two-side coated, biaxially oriented polypropylene (BOPP) film. One side is the coated print surface, and the other side is coated for pressure-sensitive adhesive anchorage.

3. LABEL-LYTE Film 70 LS-447

LABEL-LYTE Film 70 LS-447 is a coated, white, polypropylene film designed for use in hot-melt cut-and-stack labeling. It has an anti-static, matte finish, paper-like print surface that is litho-printable, as well as compatible with water- or solvent-based flexo and gravure inks and UV cured inks. LABEL-LYTE Film 70 LS-447 is a 3.0 mil white, two-side coated, anti-static, biaxially oriented polypropylene (BOPP) film. One side has a unique, paper-like coating. The other side has a hot-melt receptive coating.

4. LABEL-LYTE Film 150 LL-302

LABEL-LYTE Film 150 LL-302 is a white, corona-treated polypropylene label facestock designed for rigid and semi-rigid pressure-sensitive applications requiring durability, opacity, and excellent graphic appeal. It is a 2.6 mil white, multi-layer, biaxially oriented polypropylene (BOPP) film. Both sides are corona treated.

5. LABEL-LYTE Film 65 LL-344

LABEL-LYTE Film 65 LL-344 is a white, coated, polypropylene label facestock designed for rigid and semi-rigid pressure-sensitive applications requiring durability, opacity, and excellent graphic appeal. It is a 2.6 mil white, two-side coated, multi-layer, biaxially oriented polypropylene (BOPP) film. One side has a robust print-receptive coating. The other side has an adhesive-receptive coating.

6. LABEL-LYTE Film 50 LL-534

LABEL-LYTE Film 50 LL-534 is a clear, coated polypropylene label facestock designed for demanding pressure-sensitive applications where outstanding ink adhesion and high-speed press performance are required. It is a 2.0 mil, clear, two-side coated, biaxially oriented polypropylene (BOPP) film. One side has a robust print-receptive coating. The other side has an adhesive-receptive coating.

The films in this Example were printed on a commercial piezo inkjet printer head. An exemplary piezo inkjet printer head is the Argio SC 75 printer available from Chromas Technologies in Fort Lauderdale, Fla. The Argio is a piezo inkjet web press. It is able to print spot color UV inks in-line and is readily retrofitted or integrated within a conventional printing system. This printer has the following specifications: technology—UV curable inkjet, resolution—600 dpi, print width—7.5 inches, inks—mixable pigmented UV curable inks, substrates—coated papers, films, foils, and board with speeds up to 100 linear ft/min. If desired, other printers such as the Leggett and Platt Virtu line of superwide printers, the Olec Tsunami direct-to-plate inkjet imaging printers, piezoelectric inkjet printheads from Spectra, or better-known brands such as the Kodak or Compaq inkjet printers may be used. Whatever printer is selected, it is desirable to minimize reticulation or banding, a major defect in inkjet printing, which can be identified by bands on the print that run parallel to the printer platen.

The UV curable inks in this Example were obtained from Sun Chemical Corporation of Fort Lee, N.J., which manufactures a variety of inks and coatings for all the major printing processes. In North America and beyond, its ink and coating products are sold by: Sun Chemical, Kohl & Madden, or U.S. Ink, and with its subsidiary, Coates Group, under the "SUNJET" designation. Specifically, the UV-curing ink used for this example was the "SUNJET CRYSTAL UGE" series of jet inks. The "Crystal UGE" series of jet inks are acrylate based UV-curing products with wide ranging applicability. The products are intended for jetting through piezo DOD print heads at elevated temperatures. The inks have been developed to have good adhesion to a wide range of substrates and especially many plastics. Adhesion to olefinic plastics such as polyethylene and polypropylene (treated) is especially good, due to the low shrinkage of the product upon curing. An extensive pigmented color range is available and all colors are fully mixable, allowing users to blend a wide variety of spot colors.

The typical physical properties for these inks are a viscosity at 30° C. of 22-24 cps, a viscosity at 40° C. of 16-18 cps, a viscosity at 50° C. of 12-13 cps, and a viscosity at 60° C. of 8-10 cps. The inks have a surface tension of 24-28 dynes/cm, a cure dose of 700 mJ/cm$^2$, and a shelf life of 12 months. The actual cure dose required will depend upon ink thickness, substrate, and the UV-curing lamps being used. The above stated value of 700 mJ/cm$^2$ is a typical dose required with medium pressure mercury lamp ("H" bulb/spectrum), when curing an 8-15 micron thick layer. In general, cure doses may be reduced somewhat as higher intensity (greater irradiance) sources are used. Additionally, superior cure may be obtained by use of combinations of UV sources. Longer wavelength sources (iron or gallium doped) will offer better "through cure" due to the better penetration of the light through the pigmented ink layer. If this long wavelength exposure is combined with more broadband exposure from a typical medium pressure wavelength source (for superior surface cure) then overall doses may be reduced and line-speeds increased.

B. Evaluation of the Printable Film Coatings

The printed films were evaluated by visually observing the quality of the print. Ink transfer is evaluated by visually examining how well the ink transfers from the blanket piezo print head to the film, e.g. for completeness of the ink coating, beading, and streaking. In addition, the drop spread of each substrate was evaluated. The drop spread is the level of bleed or ink spreading from where it was placed. The spot size or drop spread increases from impact on the film at 120 microseconds, to thermal spreading on the film at 130-1000 microseconds, and on to solidification on the film at 3000 microseconds.

Ink adhesion was evaluated off-line by the T-peel test in which "SCOTCH 610" tape is applied to the printed film by laying the tape onto the film and then rubbing it down firmly (but leaving one edge free). Then the free edge of the tape was manually grasped and quickly peeled off of the film. This was done first after immediately applying the ink and then after aging the ink for 24 hours. The tape was examined for any ink residue and the film was examined for areas of missing ink. The performance in each test is given a rating of very good (no ink is removed by the tape), good (almost no ink is removed by the tape), medium (some ink is removed by the tape), low (almost all ink is removed) and bad (all ink is removed).

1. DIGI-LYTE Film 65 EW-214

Adhesion onto this substrate was very good, no removal of ink from the film during a tape test. Drop spread onto this film was good (very little spread), wets the film very well.

2. DIGI-LYTE Film 25 ET-113

Adhesion onto this substrate was very good, no removal of ink from the film during a tape test. Drop spread onto this film is good (very little spread), wets the film very well.

3. LABEL-LYTE Film 70 LS-447

Adhesion onto this substrate was very good, no removal of ink from the film during a tape test. The ink drop spread on this film is excessive, which would result in poor print definition.

4. LABEL-LYTE Film 150 LL-302

Adhesion onto this substrate was very good, no removal of ink from the film during a tape test. Ridged ink lay-down (reticulation) was observed on this film, poor ink wetting.

5. LABEL-LYTE Film 65 LL-334

Adhesion onto this substrate was very good, no removal of ink from the film during a tape test. Ridged ink lay-down (reticulation) was observed on this film, poor ink wetting.

6. LABEL-LYTE Film 50 LL-534

Adhesion onto this substrate was very good, no removal of ink from the film during a tape test. Ridged ink lay-down (reticulation) was observed on this film, poor ink wetting.

While all films exhibited good ink adhesion, it is apparent from the performance of the printable films that the DIGI-LYTE films had superior drop spread properties. While not wishing to be constrained by theory, this appears to be a direct function of the coating polymer(s) surface tension that controls wet out of the surface. The functionality of the DIGI-LYTE films coating yields a film that had a very good ink resolution (very little spread), and wets the film very well. In contrast, if the ink wets out the film or absorbs into a film like the LABEL-LYTE 70 LS-447, then an UV inkjet coating would have poor resolution.

Print quality can be evaluated using sophisticated image analysis systems, instead of through visual evaluations as described above. For example, Quality Engineering Associates, Inc. (QEA) of Burlington, Mass. designs and manufactures computerized test systems for automated analysis of print quality in inkjet printing systems. Such systems include the Personal IAS device that integrates a high resolution digital microscope and a pocket size computer into a versatile high performance measurement instrument, or the IAS-1000 device, which is an automated high-resolution print quality evaluation system that takes the subjectivity out of print testing by providing consistent, operator-independent quantitative measurements.

An IAS-1000 device was used to test UV inkjet reticulation or banding. The banding test is done optically by measuring concatenating reflectance profiles off the printed sample from successive fields of view. The reflection in this case is recorded for a scan length of 22 mm and the actual measurement happens 15 times for every mm, for a total of 330 reflections. The results of the banding test are as follows:

| Film Type | Average % Reflection | Standard Deviation |
|---|---|---|
| Digi-lyte 65 EW 214 | 0.568 | 0.006 |
| Digi-lyte 25 ET 113 | 0.650 | 0.007 |
| Label-lyte 50 LL 534 | 0.625 | 0.041 |
| Label-lyte 65 LL 334 | 0.529 | 0.046 |
| Label-lyte 150 LL 302 | 0.551 | 0.016 |

The average % reflection is not the most important measure; the standard deviation or magnitude of reflection is the more important measure. The smaller the standard deviation, the better the inkjet image will be. Accordingly, the coatings on the 65 EW 214 and 25-ET 113 films have superior inkjet imaging characteristics.

In summary, the above specification and examples of the present invention disclose a printable film, such as a label stock or flexible packaging film structure, which is capable of receiving radiation curable printing ink, especially UV curable printing ink employed in UV inkjet printing.

All patents and publications referred to herein are hereby incorporated by reference in their entireties.

This application includes references to certain trademarks. Although the use of trademarks is permissible in patent applications, the proprietary nature of the marks should be respected and every effort made to prevent their use in any manner which might adversely affect their validity as trademarks.

Although the present invention and its advantages have been described in detail, it should be understood that various changes, substitutions, and alterations could be made herein without departing from the spirit and scope of the invention as defined by the appended claims.

What is claimed is:

1. A substrate printed with a radiation cured inkjet printed image, wherein the image is printed on a coating on the substrate, the coating comprising a copolymer derived from a carboxylic acid containing vinylic unsaturation and a filler, wherein the filler comprises about 0.1 wt % to 4.0 wt % of the coating, and wherein the substrate comprises a biaxially oriented polymeric film having at least three layers, including:
   a) a core layer, wherein the polymer of the core layer comprises polypropylene; and
   b) two outer layers, wherein the polymer of at least one of the two outer layers is selected from the group consisting of ethylene homopolymer, ethylene/propylene copolymers and ethylene/propylene/butene-1 terpolymers;
   wherein the coating further comprises an acrylic polymer.

2. The printed substrate of claim 1, wherein the coating is present at a concentration of about 0.1 g/m$^2$ of the substrate to about 10 g/m$^2$ of the substrate.

3. The printed substrate of claim 1, wherein the copolymer derived from a carboxylic acid containing vinylic unsaturation is a copolymer of ethylene and a monomer selected from the group consisting of acrylic acid and methacrylic acid.

4. The printed substrate of claim 1, wherein the copolymer derived from a carboxylic acid containing vinylic unsaturation comprises more than 90 wt % of the coating.

5. The printed substrate of claim 1, wherein the coating further comprises a wax.

6. The printed substrate of claim 5, wherein the wax is selected from the group consisting of carnauba wax, microcrystalline wax, polyethylene wax and blends thereof.

7. The printed substrate of claim 5, wherein the amount of wax ranges from about 1 wt. % to about 20 wt. % based on the entire weight of the coating.

8. The printed substrate of claim 1, wherein the biaxially oriented polymeric film is a transparent film.

9. The printed substrate of claim 1, wherein the biaxially oriented polymeric film is an opaque film.

10. The printed substrate of claim 9, wherein the biaxially oriented polymeric film has at least one voided layer.

11. The printed substrate of claim 1, wherein the biaxially oriented polymeric film comprises at least five layers including a core layer, two intermediate layers contiguous to the core layer and two outer layers, the polymer of the core layer comprises polypropylene, the polymer of at least one of the two intermediate layers comprises polypropylene and the polymer of at least one of the two outer layers is selected from the group consisting of ethylene homopolymer, ethylene/propylene copolymers, and ethylene/propylene/butene-1 terpolymers.

12. The printed substrate of claim 1, wherein the biaxially oriented polymeric film is a label stock film.

13. The printed substrate of claim 1, wherein the biaxially oriented polymeric film is a flexible packaging film.

14. The printed substrate of claim 1, wherein the biaxially oriented polymeric film is metallized.

15. The printed substrate of claim 1, wherein the filler is silica.

16. The printed substrate of claim 1, wherein the amount of filler ranges from about 0.1 wt. % to about 1.0 wt. % based on the entire weight of the coating.

17. A substrate printed with a radiation cured inkjet printed image, wherein the image is printed on a coating on the substrate, the coating comprising a copolymer derived from a carboxylic acid containing vinylic unsaturation and a filler, the copolymer comprising more than 90 wt % of the coating and the filler comprising about 0.1 wt. % to about 0.2 wt. % based on the entire weight of the coating, and wherein the substrate comprises a biaxially oriented polymeric film having at least three layers, including:
  a) a core layer, wherein the polymer of the core layer comprises polypropylene; and
  b) two outer layers, wherein the polymer of at least one of the two outer layers is selected from the group consisting of ethylene homopolymer, ethylene/propylene copolymers and ethylene/propylene/butene-1 terpolymers;
  wherein the coating further comprises an acrylic polymer.

18. A label stock comprising a substrate printed with a radiation cured inkjet printed image, wherein the image is printed on a coating on the substrate, the coating comprising a copolymer derived from a carboxylic acid containing vinylic unsaturation and a filler, the copolymer comprising more than 90 wt % of the coating and the filler comprising about 0.1 wt % to 4.0 wt % of the coating, and wherein the substrate comprises a biaxially oriented polymeric film having at least three layers, including:
  a) a core layer, wherein the polymer of the core layer comprises polypropylene; and
  b) two outer layers, wherein the polymer of at least one of the two outer layers is selected from the group consisting of ethylene homopolymer, ethylene/propylene copolymers and ethylene/propylene/butene-1 terpolymers;
  wherein the coating further comprises an acrylic polymer.

19. A flexible packaging film comprising a substrate printed with a radiation cured inkjet printed image, wherein the image is printed on a coating on the substrate, the coating comprising a copolymer derived from a carboxylic acid containing vinylic unsaturation and a filler, the copolymer comprising more than 90 wt % of the coating and the filler comprising about 0.1 wt. % to about 0.2 wt. % based on the entire weight of the coating, and wherein the substrate comprises a biaxially oriented polymeric film having at least three layers, including:
  a) a core layer, wherein the polymer of the core layer comprises polypropylene; and
  b) two outer layers, wherein the polymer of at least one of the two outer layers is selected from the group consisting of ethylene homopolymer, ethylene/propylene copolymers and ethylene/propylene/butene-1 terpolymers.

20. The printed substrate of claim 1, wherein the filler comprises about 0.1 wt % of the coating.

21. The printed substrate of claim 1, wherein the filler comprises about 0.2 wt % of the coating.

22. A coated film suitable for use in inkjet printing, the film comprising:
  a) a biaxially oriented polymeric substrate comprising:
    i) a core layer, wherein the polymer of the core layer comprises polypropylene; and
    ii) a first outer layer adjacent the core layer, wherein the first outer layer comprises a polymer selected from the group consisting of ethylene/propylene copolymers and ethylene/propylene/butene-1 terpolymers;
    iii) a second outer layer adjacent the side of the core layer opposing the first outer layer; and
  b) a coating on the first outer layer, wherein the coating comprises a copolymer derived from a carboxylic acid containing vinylic unsaturation and a filler, the copolymer comprising more than 90 wt % of the coating and the filler comprising about 0.1 wt. % to about 0.2 wt. % based on the entire weight of the coating.

* * * * *